United States Patent
Pahlevaninezhad et al.

(10) Patent No.: US 11,863,011 B2
(45) Date of Patent: Jan. 2, 2024

(54) MULTIPLE INPUT PV INVERTER APPARATUS WITH ENERGY STORAGE CAPABILITY

(71) Applicant: Sparq Systems Inc., Kingston (CA)

(72) Inventors: Majid Pahlevaninezhad, Kingston (CA); Praveen Jain, Kingston (CA)

(73) Assignee: Sparq Systems Inc., Kingston (CA)

( * ) Notice: Subject to any disclaimer, the term of this patent is extended or adjusted under 35 U.S.C. 154(b) by 0 days.

(21) Appl. No.: 17/876,820

(22) Filed: Jul. 29, 2022

(65) Prior Publication Data

US 2023/0246476 A1    Aug. 3, 2023

Related U.S. Application Data

(60) Provisional application No. 63/304,301, filed on Jan. 28, 2022.

(51) Int. Cl.
*H02J 7/35*    (2006.01)
*H02J 3/38*    (2006.01)

(52) U.S. Cl.
CPC ............... *H02J 7/35* (2013.01); *H02J 3/381* (2013.01); *H02J 2207/20* (2020.01); *H02J 2300/26* (2020.01)

(58) Field of Classification Search
CPC ...... H02J 7/35; H02J 3/38; H02J 3/381; H02J 2207/20; H02J 2300/26
See application file for complete search history.

(56) References Cited

U.S. PATENT DOCUMENTS 8,102,144 B2 * 1/2012 Capp ................... H02J 1/00
320/140

* cited by examiner

*Primary Examiner* — Robert L Deberadinis
(74) *Attorney, Agent, or Firm* — Brion Raffoul (57) ABSTRACT

Systems and methods for controlling a plurality of DC/DC converters that are coupled to either a renewable energy source or an energy storage device. The system automatically detects the energy source coupled to the relevant DC/DC converter and operates accordingly. If the DC/DC converter is coupled to a renewable energy source (such as a PV panel), the system maximizes power extraction from the energy source. If the DC/DC converter is coupled to an energy storage device, the system performs charge/discharge functions for the attached energy storage device.

10 Claims, 6 Drawing Sheets

MULTIPLE INPUT PV INVERTER APPARATUS WITH ENERGY STORAGE CAPABILITY

RELATED APPLICATIONS

This application claims the benefit of U.S. Provisional Application No. 63/304,301 filed on Jan. 28, 2022.

TECHNICAL FIELD

The present invention relates to systems, methods, and devices relating to power conversion from renewable power sources for provision to a power grid. More specifically, the present invention relates to using a unified controller for controlling multiple DC/DC converters coupled to renewable power sources or to energy storage devices. The unified controller provides maximum power point tracking for converters coupled to renewable power sources and provides charge/discharge functions for the converters coupled to energy storage devices.

BACKGROUND

There is a growing number of photovoltaic (PV) applications where direct current/alternating current (DC/AC) inverters are required to provide maximum power point tracking (MPPT) to harvest maximum solar energy from PV panels and to thereby feed clean AC electricity into the power grid. However, the energy generated by solar energy harvesting systems depends on weather conditions and, as such, the availability of such power can be intermittent. Energy storage systems can effectively address the issue of intermittency for solar energy harvesting systems by storing energy that has been harvested and then releasing that energy when needed.

Figure 1:
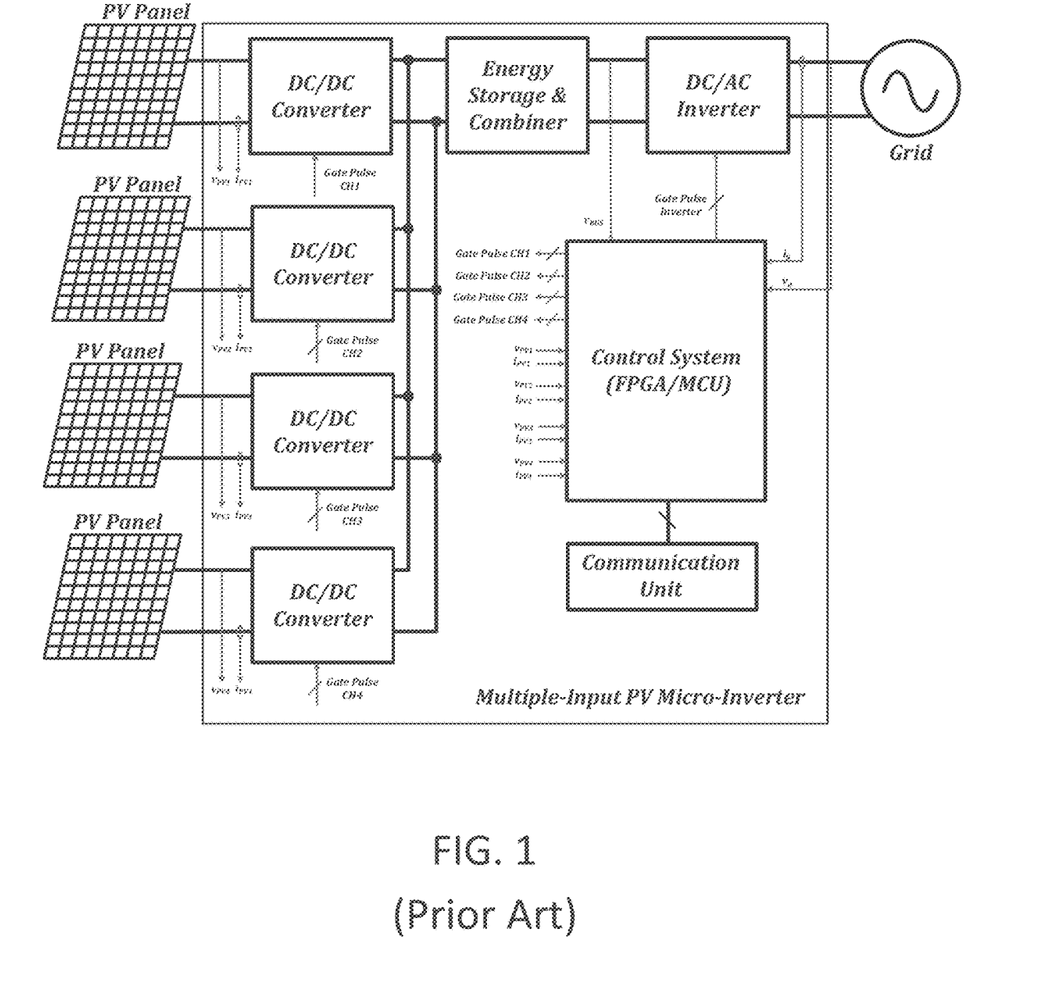
FIG. 1 is a microinverter system according to the prior art.

Micro-inverters that can harvest energy from multiple PV panels are known. FIG. 1 shows an exemplary arrangement of such a system. As can be seen from FIG. 1, the system extracts power from four PV panels, combines the harvested power, and finally injects the energy into the utility grid. This architecture allows for independent maximum power point tracking for each individual PV panel. Although this architecture can provide high performance for solar energy harvesting systems, it lacks the ability to store energy.

Based on the above, there is therefore a need for systems and devices which allow for the connection of either a PV panel or an energy storage device at any of the DC input terminals of a micro-inverter.

SUMMARY

The present invention provides systems and methods for controlling a plurality of DC/DC converters that are coupled to either a renewable energy source or an energy storage device. The system automatically detects the energy source coupled to the relevant DC/DC converter and operates accordingly. If the DC/DC converter is coupled to a renewable energy source (such as a PV panel), the system maximizes power extraction from the energy source. If the DC/DC converter is coupled to an energy storage device, the system performs charge/discharge functions for the attached energy storage device.

In a first aspect, the present invention provides a system for feeding AC power to a power grid, the system comprising:
  a DC/AC inverter;
  a plurality of DC/DC converters, each DC/DC converter being directly coupled between an energy source and said DC/AC inverter;
  a control system for controlling said DC/AC inverter and for controlling at least one of said plurality of DC/DC converters;
wherein
  said DC/AC inverter is coupled between said power grid and said plurality of DC/DC converters;
  said energy source is either a renewable energy source or an energy storage device;
  for each of said plurality of DC/DC converters controlled by said control system, said control system automatically detects whether said DC/DC converter is coupled to a renewable energy source or to an energy storage device;
  for each of said plurality of DC/DC converters controlled by said control system, when said DC/DC converter is coupled to a renewable energy source, said control system operates to maximize power received from said renewable energy source;
  for each of said plurality of DC/DC converters controlled by said control system, when said DC/DC converter is coupled to an energy storage device, said control system controls a charge and discharge of said energy storage device.

In a second aspect, the present invention provides a DC/DC converter subcontrol system for controlling a DC/DC converter, the subcontrol system comprising:
  a voltage sliding controller receiving:
    a voltage reading for a voltage produced by said DC/DC converter; and
    a current reading for current produced by said DC/DC converter;
  a modulator receiving a duty cycle and a switching frequency from said voltage sliding controller;
wherein
  said voltage sliding controller produces said duty cycle and said switching frequency based on said voltage reading and said current reading;
  said modulator produces gate pulses for said DC/DC converter based on said duty cycle and said switching frequency;
  said DC/DC converter is coupled directly to an energy source that either a renewable energy source or an energy storage device;
  said subcontrol system automatically detects whether said DC/DC converter is coupled to a renewable energy source or to an energy storage device;
  when said DC/DC converter is coupled to a renewable energy source, said subcontrol system operates to maximize power received from said renewable energy source;
  when said DC/DC converter is coupled to an energy storage device, said subcontrol system controls a charge and discharge of said energy storage device.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 2:
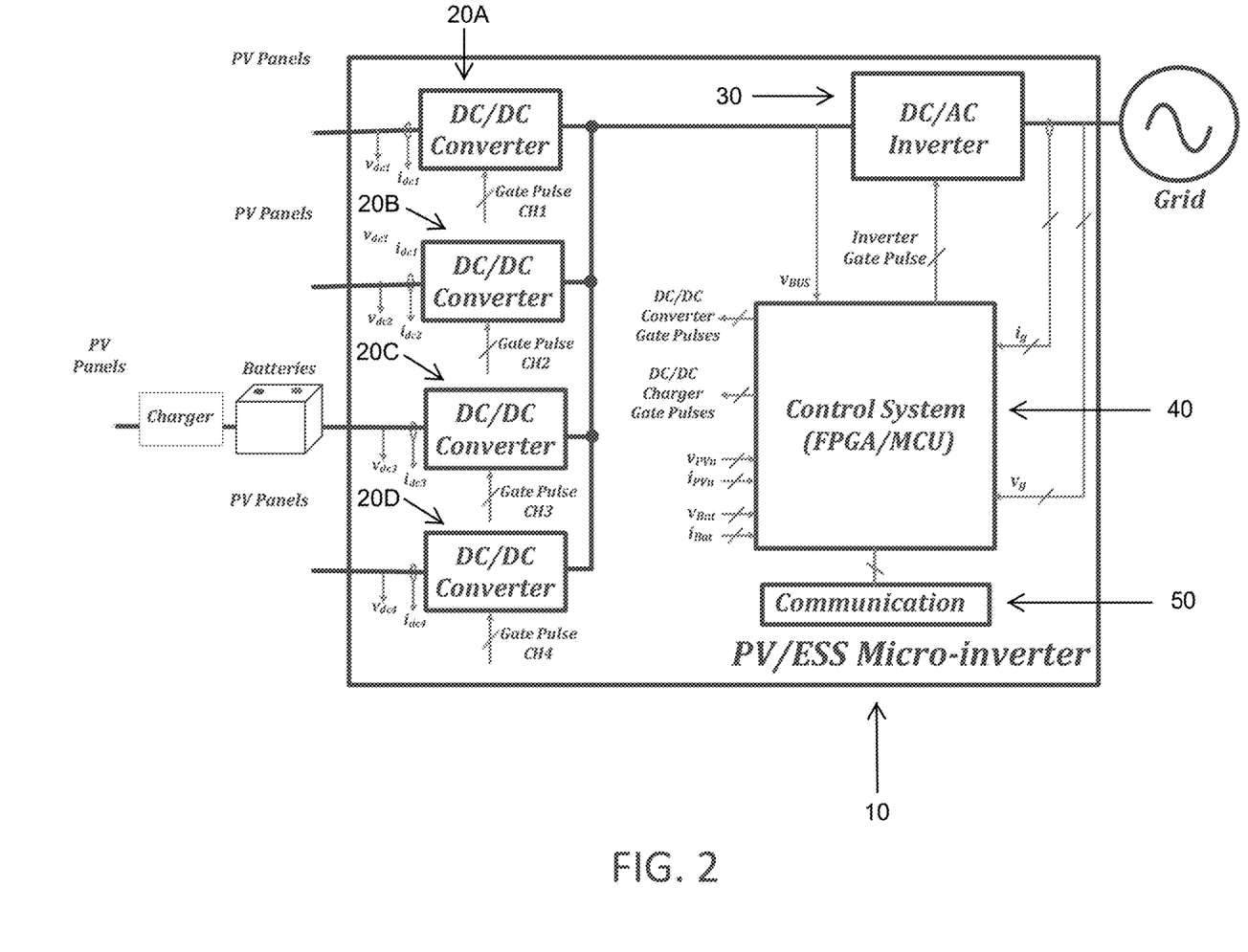
FIG. 2 is a microinverter system according to one aspect of the present invention.

Referring to FIG. 2, a block diagram of a micro-inverter system according to one aspect of the present invention is illustrated. The system illustrated in FIG. 2 has the capability of accepting DC power either from a PV (or any renewable energy source) or from an energy storage device (such as a battery). As can be seen from the figure, the microinverter has multiple DC inputs that can be connected to either a PV panel or an energy storage unit (e.g., a battery). The microinverter system 10 includes four DC/DC converters 20A, 20B, 20C, 20D, a DC/AC inverter 30, a control system 40, and a communication block 50. The control system is capable of automatically determining whether the DC/DC converters 20A-20D are coupled to a renewable power source or an energy storage device. The control system 40 can automatically perform maximum power point tracking or control the discharge of the energy storage device depending on what it detects the relevant converter is coupled to. The DC/AC inverter 30 converts the DC power into AC power compatible with the grid and/or loads. The control system 40 generates the gate pulses for the converters 20A-20D and closed-loop controllers for the converters are implemented in this control system block 40. The control system 40 also receives and transmits information through the communication block 50.

Figure 3:
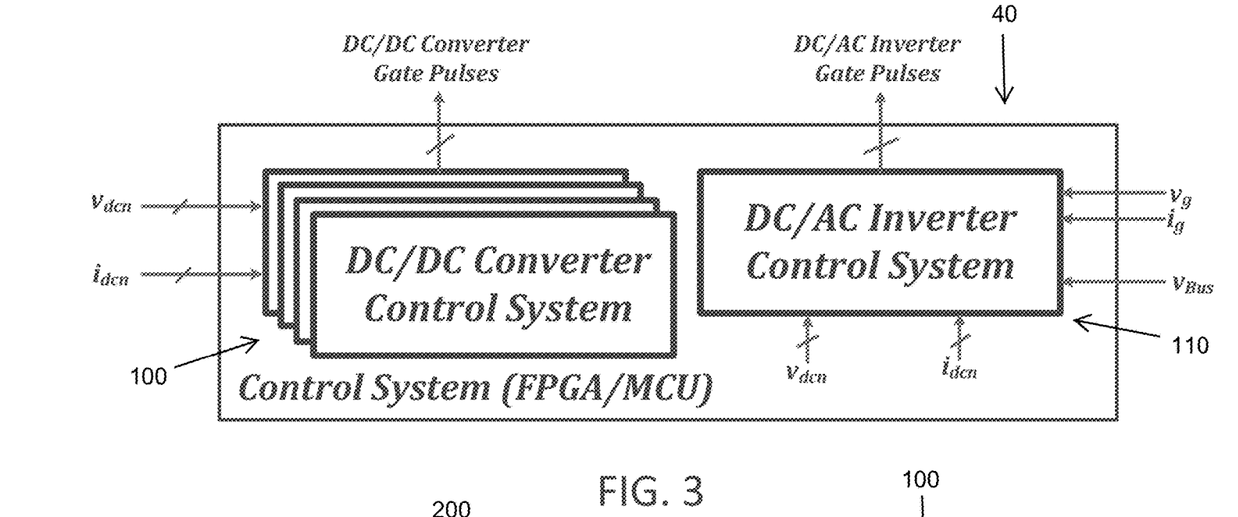
FIG. 3 illustrates the internal structure of the control system used in the microinverter system of FIG. 2.

It should also be clear that the energy storage device may be coupled, in turn, to a separate renewable energy source. The energy storage device can then be charged by the renewable energy source Referring to FIG. 3, the control system 40 includes multiple DC/DC Converter Control System blocks 100 and a DC/AC Inverter Control System block 110. Each DC/DC converter control system block controls a single DC/DC converter while the DC/AC inverter control system block 110 controls the DC/AC inverter 30. Each DC/DC Converter Control System block 100 receives the input voltage ($v_{dcn}$) and current ($i_{dcn}$) of the DC/DC converter that it controls and generates the gate pulses for that DC/DC converter. The DC/AC Inverter Control System block 110 receives the DC bus voltage ($v_{Bus}$), grid voltage ($v_g$), grid current ($i_g$) from the grid and generates the gate pulses for the DC/AC inverter 30.

Figure 4:
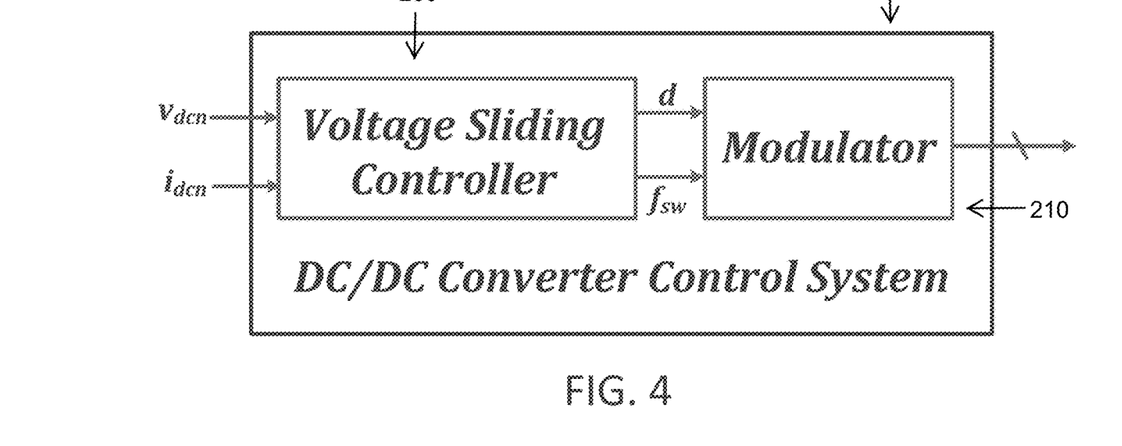
FIG. 4 illustrates an embodiment of the DC/DC converter control system as shown in FIG. 3.

Each DC/DC converter control system block has a structure as illustrated in FIG. 4. Referring to FIG. 4, as can be seen, each DC/DC converter control system block 100 includes a Voltage Sliding Controller 200 and a Modulator 210. The Voltage Sliding Controller 200 receives the input voltage ($v_{dcn}$) and current ($i_{dcn}$) of the respective DC/DC converter being controller and generates the duty cycle (d) and the switching frequency ($f_{sw}$) of the gate pulses of that DC/DC converter being controlled. The Modulator 210 receives the duty cycle (d) and the switching frequency ($f_{sw}$) from the voltage sliding controller 200 and generates appropriate gate pulses for the DC/DC converter being controlled.

Figure 5:
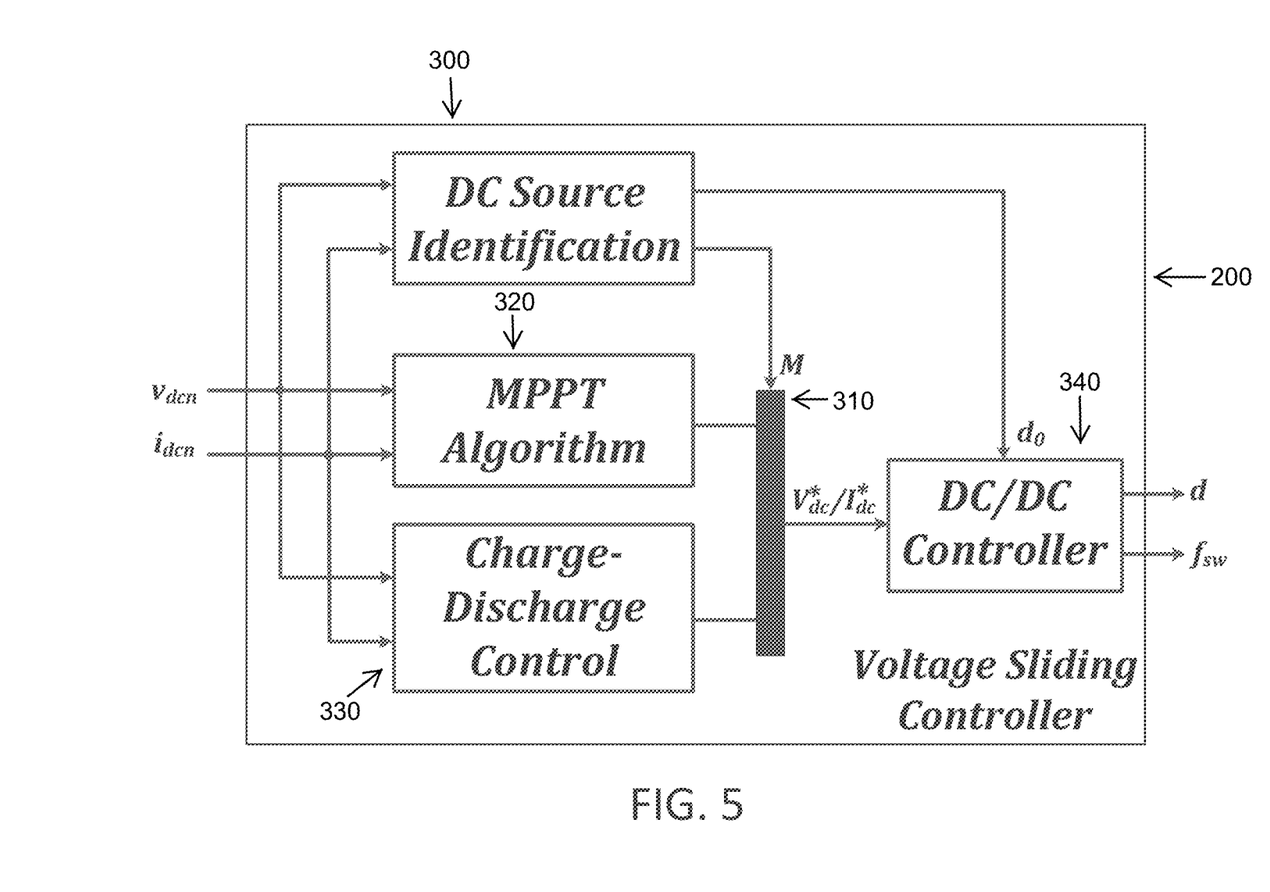
FIG. 5 shows the components of the voltage sliding controller as shown in FIG. 4.

Referring to FIG. 5, the Voltage Sliding Controller 200 according to one aspect of the invention includes the following blocks:

A DC Source Identification Block 300. The DC source identification block determines the type of the input DC power source. This block 300 determines whether the input of the DC/DC converter controlled is connected to a PV panel (or a suitable renewable energy source) or an energy storage unit. In one implementation, if the DC energy source is identified as a PV Panel this block will generate "1" and if the DC energy source is identified as an energy storage device, the block 300 it will generate "0".

A Multiplexer 310 selects between the MPPT Algorithm Block 320 or the Charge-Discharge Control Block 330. The multiplexer 310 receives the output of the DC source identification block 300 and, if M='1', the MPPT Algorithm block 320 is enabled and if M='0' the Charge-Discharge Control is enabled.

An MPPT algorithm block 320 that performs/executes a maximum power point tracking process if the input DC source is identified as a PV panel or a suitable renewable energy source. This block 320 searches for the maximum power point, where the maximum power can be harvested/received from the PV panel. This block 320 produces the reference value for the input voltage ($V_{dc}^*$) or the input current ($I_{dc}^*$) if the input DC source/energy source is identified as a PV panel/renewable energy source. A Charge/Discharge Control block 330. This block 330 controls the charge and discharge of the energy storage if the input DC source/energy source is identified as an energy storage device. This block 330 produces the reference value for the input voltage ($V_{dc}^*$) or the input current ($I_{dc}^*$) if the input DC source is identified as an energy storage device.

A DC/DC Controller 340 that receives the output of the multiplexer 310. The controller 340 receives the input voltage ($V_{dc}^*$) or the input current ($I_{dc}^*$), and the initial duty cycle ($d_0$). The controller 340 then generates the duty cycle (d) and the switching frequency ($f_{sw}$) for the DC/DC converter that is being controlled by the DC/DC converter control system block.

Figure 6:
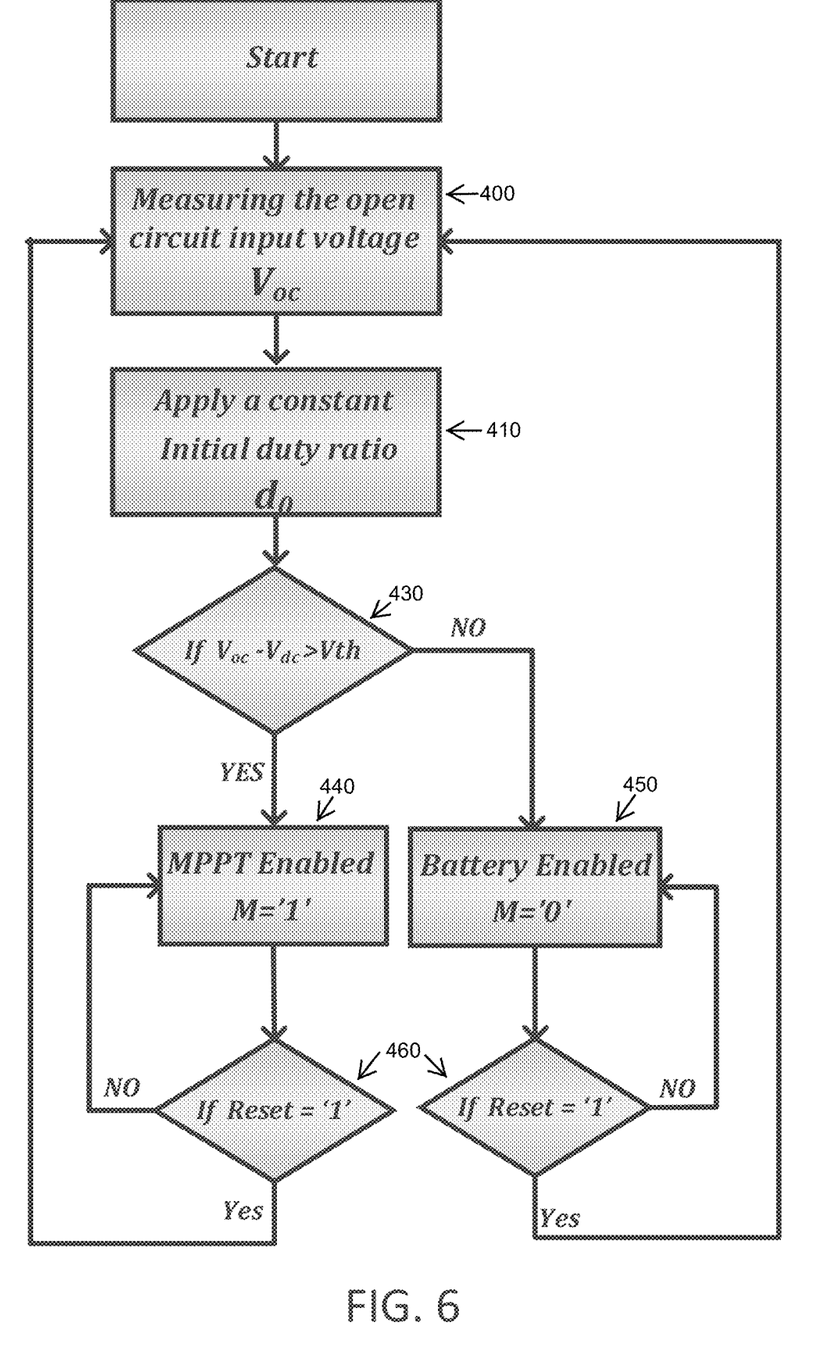
FIG. 6 is a flowchart detailing the steps in a process for automatically determining if an energy source coupled to a DC/DC converter is a renewable energy source or an energy storage device.
Figure 7:
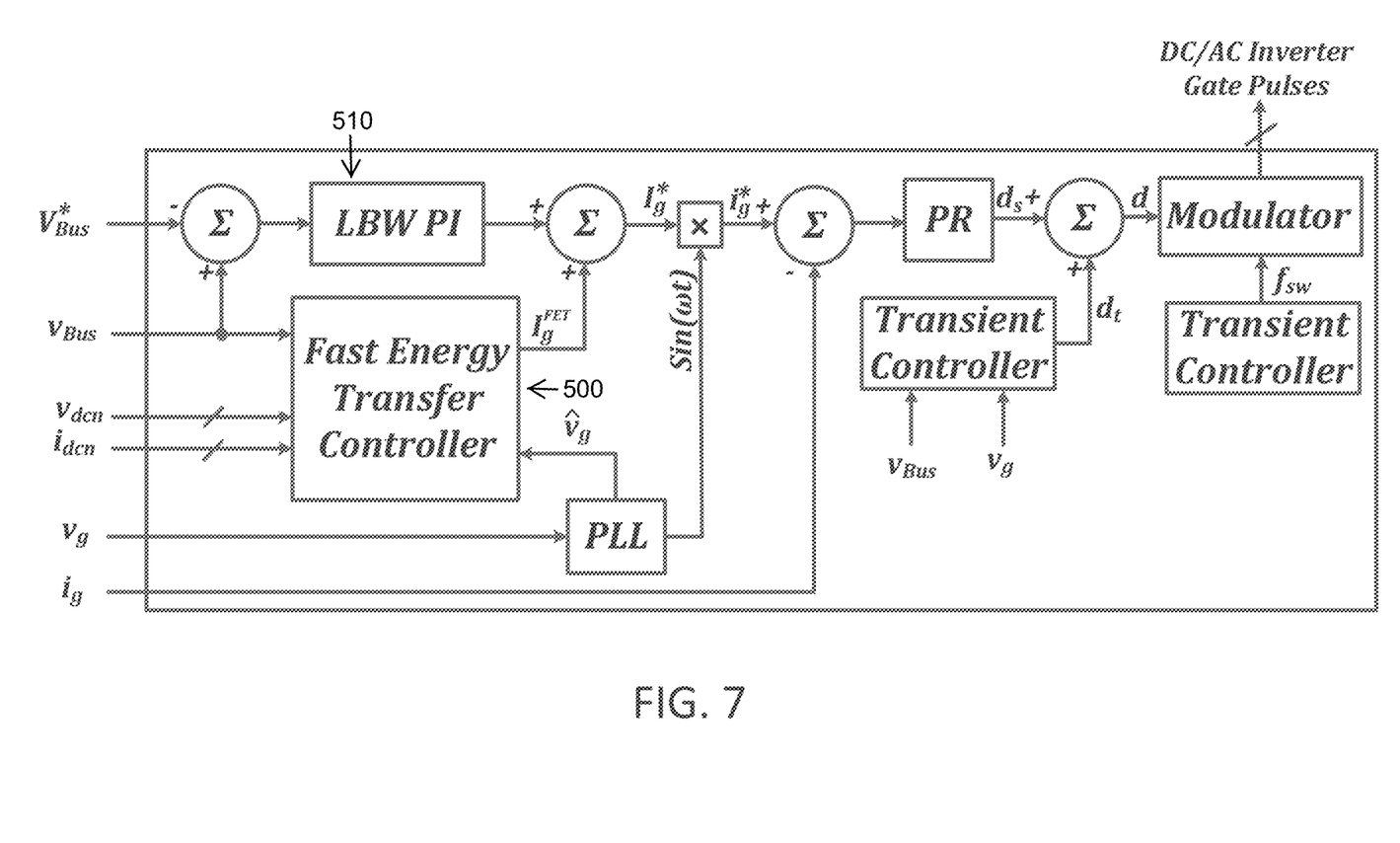
FIG. 7 details the components in a DC/AC inverter control system according to one aspect of the present invention.

Referring to FIG. 6, illustrated is a flowchart of the process executed by the DC Source Identification Block 300. As can be seen from the flowchart, the process begins at step 400, that of measuring the input voltage when all the switches are off (open circuit voltage, $V_{oc}$). Then, a predefined duty cycle ($d_0$) is applied (step 410) and the input voltage ($V_{dc}$) is measured accordingly (step 420). Decision 430 then combines determining the difference between the open circuit voltage and the input voltage and determining how the difference compares to a predetermined threshold. If the open circuit voltage subtracted from this voltage ($V_{oc}-V_{dc}$) is higher than the predefined/predetermined threshold ($V_{th}$), then the output from the MPPT block 320 is used (step 440) as the energy source input is identified as a PV panel/renewable energy source. On the other hand, if the difference is equal to or lower than the predefined threshold, then step 450 is that of enabling the output from the charge/discharge control block 330 as the energy source is identified as an energy storage device. Step 460 is then of checking if the system is configured for a reset—if a reset is not detected, then the logic loops back to either step 440 or step 450 as show. If a reset is detected, then the logic loops back to step 400.

Referring to FIG. 6, the block diagram of the Inverter Control System is illustrated. In single-phase systems and in unbalanced three-phase systems, there may be a significant amount of double frequency voltage ripple across the DC bus capacitor. Due to the double frequency ripple present at the DC-bus, the bandwidth of the DC bus voltage controller must be limited, otherwise the grid current waveform will have a significant amount of harmonics. In the present invention, the Fast Energy Transfer Controller Block 500 is used to address this problem. This block 500 adds an additional term ($I_g^{FET}$) to the output of the low-bandwidth PI (LBW PI) controller 510. The additional term ($I_g^{FET}$) is calculated based on the input power (input power: $\Sigma(v_{dc}i_{dc})=P_{in}$) and the DC bus voltage ($v_{Bus}$), and the peak of the grid voltage ($\hat{v}_g$) as follows:

$$I_g^{FET} = [2\sum(v_{dc}i_{dc}) - 2\dot{E}]/\hat{v}_g$$

$$E = \frac{L}{2}C_{Bus}v_{Bus}^2$$

It should be clear that the various aspects of the present invention may be implemented as software modules in an overall software system. As such, the present invention may thus take the form of computer executable instructions that, when executed, implements various software modules with predefined functions.

It should be clear that the various modules of the present invention may be implemented as ASIC (application specific integrated circuits) or as a specifically programmed microcontroller. The present invention may also be implemented using other technologies such as FPGA and DSP. Other implementations, which may use different discrete modules that, when combined, perform the functions detailed above, are also possible.

It should also be clear that the energy storage device may be a battery, a supercapacitor, or any other device that stores energy. The renewable energy source may be a PV panel as illustrated or it may be any energy source that produces DC power and is renewable and may be based on wind, solar energy, or any other natural potential power source.

As an alternative to the multiplexer in the system, the system may operate to enable/disable specific blocks instead of passing data/signals by way of the multiplexer.

It should also be clear that the present invention may use any form of MPPT processes that are known. As examples, perturb, perturb and observe, enhanced perturb and observe or any such similar variants/embodiments of MPPT processes may be used.

Embodiments or portions of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for feeding AC power to a power grid, the system comprising:
    a DC/AC inverter;
    a plurality of DC/DC converters, each DC/DC converter being directly coupled between an energy source and said DC/AC inverter;
    a control system for controlling said DC/AC inverter and for controlling at least one of said plurality of DC/DC converters;
   wherein
    said DC/AC inverter is coupled between said power grid and said plurality of DC/DC converters;
    said energy source is either a renewable energy source or an energy storage device;
    for each of said plurality of DC/DC converters controlled by said control system, said control system automatically detects whether said DC/DC converter is coupled to a renewable energy source or to an energy storage device;
    for each of said plurality of DC/DC converters controlled by said control system, when said DC/DC converter is coupled to a renewable energy source, said control system operates to maximize power received from said renewable energy source;

for each of said plurality of DC/DC converters controlled by said control system, when said DC/DC converter is coupled to an energy storage device, said control system controls a charge and discharge of said energy storage device.

2. The system according to claim 1 wherein said control system comprises:
- at least one DC/DC converter subcontrol system for controlling said at least one DC/DC converter controlled by said control system; and
- a DC/AC inverter subcontrol system for controlling said DC/AC inverter.

3. The system according to claim 2 wherein each of said at least one DC/DC converter subcontrol system comprises
- a voltage sliding controller receiving:
  - a voltage reading for a voltage produced by said DC/DC converter controlled by said DC/DC converter subcontrol system; and
  - a current reading for current produced by said DC/DC converter controlled by said DC/DC converter subcontrol system;
- a modulator receiving a duty cycle and a switching frequency from said voltage sliding controller;
wherein
said voltage sliding controller produces said duty cycle and said switching frequency based on said voltage reading and said current reading;
said modulator produces gate pulses for said DC/DC converter controlled by said DC/DC converter subcontrol system based on said duty cycle and said switching frequency.

4. The system according to claim 3 wherein said voltage sliding controller comprises:
- a DC source identification block for determining whether said energy source is either a renewable energy source or an energy storage device;
- an MPPT processor block for executing an MPPT process;
- a charge/discharge control block for controlling a charge/discharge of said energy storage device;
- a multiplexer controlled by an output of said DC source identification block;
- a DC/DC controller block producing said duty cycle and said switching frequency based on data received from said multiplexer;
wherein
said multiplexer is coupled to said MPPT processor block and said charge/discharge control block;
said multiplexer passes data from said MPPT processor block or from said charge/discharge control block to said DC/DC controller block based on said output of said DC source identification block.

5. The system according to claim 4 wherein said DC identification block executes a process to determine whether said energy source is either a renewable energy source or an energy storage device, said process comprising:
- measuring an input open circuit voltage;
- applying a predefined duty cycle;
- measuring an input voltage;
- calculating a difference between said input open circuit voltage and said input voltage;
- determining if said difference is higher than a predefined threshold;
- determining that said energy source is a renewable energy source if said difference is higher than said predefined threshold;
- determining that said energy source is an energy storage device if said difference is equal to or lower than said predefined threshold.

6. The system according to claim 2 wherein said DC/AC inverter control subsystem includes a Fast Energy Transfer Controller block for limiting a bandwidth of a DC bus voltage controller.

7. A DC/DC converter subcontrol system for controlling a DC/DC converter, the subcontrol system comprising:
- a voltage sliding controller receiving:
  - a voltage reading for a voltage produced by said DC/DC converter; and
  - a current reading for current produced by said DC/DC converter;
- a modulator receiving a duty cycle and a switching frequency from said voltage sliding controller;
wherein
said voltage sliding controller produces said duty cycle and said switching frequency based on said voltage reading and said current reading;
said modulator produces gate pulses for said DC/DC converter based on said duty cycle and said switching frequency;
said DC/DC converter is coupled directly to an energy source that either a renewable energy source or an energy storage device;
said subcontrol system automatically detects whether said DC/DC converter is coupled to a renewable energy source or to an energy storage device;
when said DC/DC converter is coupled to a renewable energy source, said subcontrol system operates to maximize power received from said renewable energy source;
when said DC/DC converter is coupled to an energy storage device, said subcontrol system controls a charge and discharge of said energy storage device.

8. The subcontrol system according to claim 7 wherein said voltage sliding controller comprises:
- a DC source identification block for determining whether said energy source is either a renewable energy source or an energy storage device;
- an MPPT processor block for executing an MPPT process;
- a charge/discharge control block for controlling a charge/discharge of said energy storage device;
- a multiplexer controlled by an output of said DC source identification block;
- a DC/DC controller block producing said duty cycle and said switching frequency based on data received from said multiplexer;
wherein
said multiplexer is coupled to said MPPT processor block and said charge/discharge control block;
said multiplexer passes data from said MPPT processor block or from said charge/discharge control block to said DC/DC controller block based on said output of said DC source identification block.

9. The subcontrol system according to claim 7 wherein said subcontrol system determines a type of energy source coupled to said DC/DC converter by executing an energy source determination process, said process comprising:
- measuring an input open circuit voltage;
- applying a predefined duty cycle;
- measuring an input voltage;
- calculating a difference between said input open circuit voltage and said input voltage;

determining if said difference is higher than a predefined threshold;

determining that said energy source is a renewable energy source if said difference is higher than said predefined threshold;

determining that said energy source is an energy storage device if said difference is equal to or lower than said predefined threshold.

10. The subcontrol system according to claim 9 wherein said process is executed by a DC source identification block in said subcontrol system and wherein a result of said process determines whether said subcontrol system implements an MPPT process or controls a charge/discharge of said energy source.

\* \* \* \* \*